Feb. 24, 1942.   F. H. SHAW   2,274,279
MULTIPLE PRESSURE DEVICE FOR MOLDING PLASTICS
Filed Aug. 25, 1938
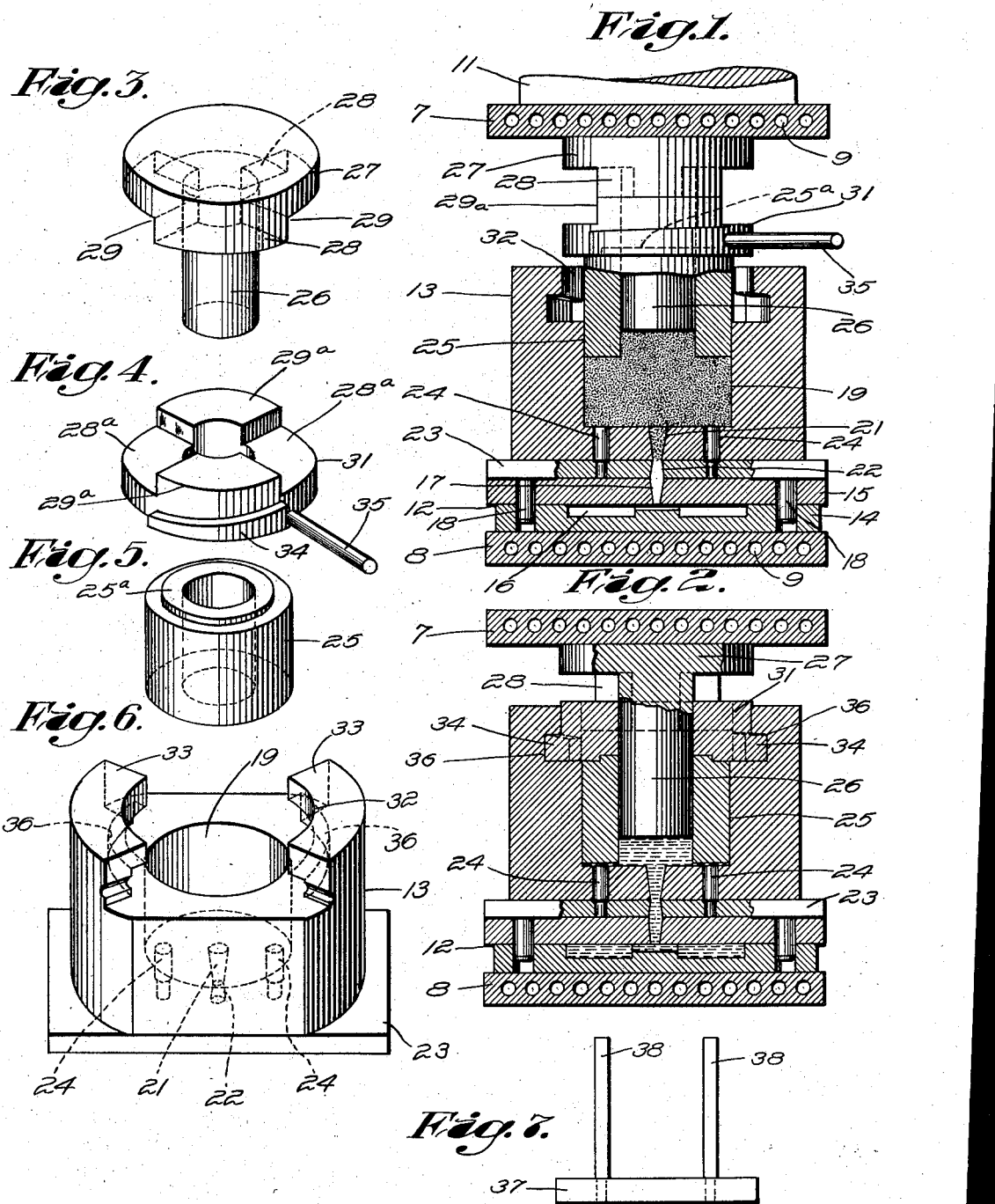
Inventor
Frank H. Shaw
by Brown & Parham
Attorneys
Witness
W. B. Thayer Patented Feb. 24, 1942

2,274,279

UNITED STATES PATENT OFFICE 2,274,279

MULTIPLE PRESSURE DEVICE FOR MOLDING PLASTICS

Frank H. Shaw, South Orange, N. J., assignor to Shaw Insulator Company, Irvington, N. J., a corporation of New Jersey Application August 25, 1938, Serial No. 226,610

9 Claims. (Cl. 18—30)

This invention relates to machines for molding plastics and more particularly to molding machines of the type in which a heated cylinder is provided into which a charge of plastic is supplied and in which a plunger operates to apply pressure to the plastic to render it fluent and to discharge it from the cylinder into the cavity of a mold in which the plastic is set or cured to form an article.

In such machines the plunger is operated by a ram and the maximum pressure which can be applied to the plastic by the plunger is limited by the line pressure of fluid which operates the ram and the ratio of the areas of the ram and the plunger.

The general object of this invention is to provide a novel improvement in the above type of machines which is adapted to increase or multiply the pressure of the ram, at a given line pressure, on the plastic in the cylinder of the machine.

Another object of the invention is to provide a novel improvement in the above type of machine adapted to apply different pressures to the plastic in the cylinder of such machine. Thus, with a ram of a certain size operated at a given line pressure, an initial pressure may be used for compressing and rendering fluent the molding compound and for charging a mold therewith, and a higher pressure may then be applied while the molded piece is setting or curing.

A more specific object is to provide a novel improvement in the above type of machine by means of which the ratio of the area of the ram and the effective area of the plunger in the cylinder may be changed without necessarily increasing the size of the ram or reducing the loading capacity of the cylinder.

Other objects and advantages of the invention will be pointed out, or will be apparent from, the following description of a specific embodiment illustrated in the accompanying drawing, in which:

Figure 1 is a view in vertical section of portions of a machine embodying the invention;

Fig. 2 is a similar view showing some of the parts in different positions;

Figs. 3 to 6 inclusive are views in perspective of an inner force plug, a locking ring, an outer force plug and a cylinder shown in Figs. 1 and 2; and Fig. 7 is a view in elevation of a force plate.

By way of illustration only and not in limitation, I have shown my invention in a molding machine in which a cylinder and plunger means are assembled with a die to provide a mold unit which is placed between the platens of the machine to mold an article and removed from between the platens for the removal of the molded article from the die.

The platens of such machine are shown at 7 and 8, said platens being cored as shown at 9 to receive suitable temperature controlling medium. The upper platen 7 is lowered and raised by a ram partially shown at 11 while the lower platen 8 may be stationary or may also be operated by a ram, not shown.

The mold unit includes a die 12 to be charged with plastic to form an article and a pot or cylinder 13 which receives a charge of plastic for delivery to the die.

The die 12 includes the bottom and top parts 14 and 15, the part 14 containing a cavity 16 which receives plastic through sprue 17 in the top part 15. The die parts are aligned by pins 18.

Cylinder 13 contains a chamber 19, the bottom of which contains sprue 21 which registers with sprue 22 in a pin plate 23, this sprue being aligned with sprue 18 in the die part 15.

Plate 23 carries pins 24 which fit in holes in the bottom of cylinder 13, the purpose of which holes is explained hereinafter.

The means specifically illustrated for applying different pressures to plastic in cylinder 13 and for multiplying the pressure of ram 11 comprises a two-part plunger, the effective area of which may be reduced. Said plunger includes the outer tubular part or force plug 25 which has a tight sliding fit in the chamber 19, and the inner piston or force plug 26 which has a tight sliding fit in the outer force plug 25.

Force plug 26 has a head 27, the flat top of which may be engaged by upper platen 7, said head having two diametrically opposed, segmental projections or fingers 28 on the underside thereof. Said projections are of the same size and shape. Between such projections two opposed segmental recesses 29 are formed, also of the same size and shape.

Interposed between head 27 and the sleeve piston 25 is a locking ring 31 which has two projections 29a shaped to fit the recesses 29 on head 27 and between which are formed two recesses 28a shaped to receive projections 28 on head 27.

Ring 31, which is of greater diameter than chamber 19, may fit in an enlarged opening 32 in the top of cylinder 13. At opposite sides of this opening, the top of the cylinder is cut away, as shown at 33, Fig. 6, to provide two openings for tapered lugs 34 formed on ring 31, and to provide clearance for swinging a handle 35 on the ring.

In the opposite walls of opening 32 tapered slots 36 are formed to receive lugs 34 on ring 31. Thus, a bayonet joint is provided between the locking ring 31 and cylinder 13.

In operation, the parts of die 12 are assembled and the pin plate 23 and cylinder 13 brought together and mounted on the die with the sprues 21, 24, 17 in line. Suitable means, not shown, may be provided for holding the die 12 in registry with pin plate 23 and pins 18 may be mounted in pin plate 23 to hold the plate and die in alignment.

The inner force plug 26 and locking ring 31 may now be assembled with projections 28 on the force plug engaging and exactly overlying projections 29a on the locking ring.

Molding compound is now charged into chamber 19 in a quantity in excess of that necessary to fill cavity 16, so that hydrostatic pressure may be maintained on the mold charge during the setting or curing period.

The outer force plug 25 is now placed in the chamber 19, and the force plug 26 and locking ring 31 assembled as a unit therewith. The ring 31 is centered on force plug 25 by a boss 25a on force plug 25 which fits in a recess in the underside of said ring. See Figs. 1 and 5. Ring 31 is placed in such angular position that lugs 34 and handle 35 line up with recesses 33 in cylinder 13.

Platen 7 is now forced down by ram 11 into engagement with head 27 of inner force plug 26 and the pressure on the platen continued. Steam or other heating medium is circulated through platens 7 and 8 to heat the mold unit and thus heat the molding material in chamber 19. As the powder is heated and compressed, it becomes fluent and is forced through the sprues 21, 22, 18 into the heated die cavity 16.

Such discharge of the plastic from chamber 19 results from the joint downward movement of inner and outer force plugs 26 and 25, the pressure of ram 11 on head 27 being transmitted through projections 28, 29a and ring 31 to the outer force plug 25. In this operation, a certain pressure is applied to the plastic, depending upon the line pressure acting on ram 11 and the ratio of the area of the ram to the total area of the outer and inner force plugs, that is, the total area of the plunger comprising the two force plugs.

When the outer force plug 25 reaches the bottom of its stroke, the pressure of ram 11 on platen 7 and on the inner force plug 27 is released and the locking ring 31 rotated 90 degrees by handle 35 to engage lugs 34 thereon with slots 36 (see Fig. 2). This locks the outer force plug 25 in lowermost position. At this time force plug 26 will be held up by the remaining plastic in cylinder 19 below this force plug. Force plug 26 should now be placed in such angular position that its projections 28 register with recesses 28a in ring 31.

Pressure is again applied to head 27 of plug 26 by ram 11 and platen 7 to resume the application of pressure on the plastic preferably at a much greater pressure per square inch on the plastic than exerted jointly by force plugs 25 and 26. Force plug 26 is prevented from rising at this time by locking ring 31.

The resumed pressure may serve to discharge additional plastic into the die and to further compact the plastic in the die cavity under the pressure of the ram multiplied by the inner force plug 26. Or such increased hydrostatic pressure may be applied only during the period in which the molded piece cures or hardens under heat supplied by the platens 7 and 8.

Upon completion of the molding operation, the mold unit is removed from between the platens 7 and 8, broken down and the article removed from the die. The pin plate and pins are disengaged from cylinder 13 and after removal of force plug 26 and locking ring 31, the outer force plug 25 which fits tightly in chamber 19 is driven out of the chamber by means of a force plate 37. This force plate has pins 38 mounted therein which are inserted through the openings in the bottom of cylinder 13 to engage the bottom of force plug 25 to drive it out of cylinder 13.

It will be apparent from the foregoing and from the drawing that I have provided novel means for accomplishing the objects hereinabove set forth. With a ram 11 of given size and a given line pressure, an initial pressure may be applied to the plastic in cylinder 13 in proportion to the ratio of the area of ram 11 to the total areas of force plugs 25 and 26. The ram pressure may then be multiplied or increased on the plastic in cylinder 13 by the operation of inner force plug 26 only.

For example, with ram 11 having a diameter of 6 inches, a line pressure of 2000 pounds per square inch, and the total plunger diameter 3 inches, the initial pressure on the plastic will be approximately 8000 pounds per square inch. With an inner force plug of 1 inch in diameter, said plug when operated alone will apply a pressure to the plastic in cylinder 13 of approximately 72,000 pounds per square inch. This greatly increased pressure is obtained without reducing the loading or charging capacity of chamber 19 in cylinder 13 and without changing the size of ram 11. In other words, the ratio of ram area to the plunger area is increased by reducing the effective plunger area.

It will be understood that the effective area of the die cavity should not exceed that of inner force plug 26 unless the parts 14 and 15 of the die are clamped or locked or otherwise held together. Special clamping or locking means may be provided for this purpose but, being common in the art, have not been illustrated.

The invention is of particular utility in molding so-called impact materials, that is, phenol-formaldehyde resins loaded with canvas stock or filler. In molding articles from such materials, it is especially advantageous to employ a certain initial pressure for charging the mold cavity and a very high pressure during the cure, as heretofore described.

However, the invention may be employed in molding other types of plastics and may be embodied in machines differing in construction from that shown in the drawing without departing from the scope of the appended claims. For example, the invention may be employed in machines in which the die members, cylinder and plunger are permanently mounted and the die members are operated automatically.

The invention also may be used in a manner different from that described above. For example, in cases where a relatively small cavity die is employed, force plug 25 may be locked in position and the molding compound placed inside the force plug to be acted on only by the inner force plug 26 to charge the die and apply hydrostatic pressure during the setting or curing period.

It also will be apparent that force plugs 25 and 26 may be varied in internal and external diameters respectively to suit different operating requirements.

Other changes and variations in the details of construction and mode of operation may be made without departing from the scope of the claims.

Having described my invention, what I claim is:

1. A machine for molding plastics comprising a die, a cylinder containing a chamber communicating with said die for charging said die with plastic, and means for applying different degrees of pressure to plastic in said cylinder comprising a force plug fitting in said chamber, and a second force plug fitting in and movable relative to said first-named force plug, and means for moving said force plugs together and for thereafter moving said second force plug alone toward the discharge end of said chamber to charge said die with plastic.

2. A machine for molding plastics comprising a die, a cylinder containing a chamber communicating with said die for charging said die with plastic, a tubular force plug fitting in said chamber, a second force plug fitting in and movable relative to said tubular force plug, means for holding said tubular force plug and said cylinder in relatively fixed positions during movement of said second force plug, and means for effecting such movement of said second force plug to discharge plastic from said chamber into said die.

3. A machine for molding plastics comprising a die, a cylinder containing a chamber communicating with said die for charging said die with plastic, and means for applying pressure to plastic in said cylinder comprising a force plug in said chamber, a second force plug within and movable relative to the first-named force plug, and means for moving said force plugs together in the same direction and for moving said second force plug relative to the first-named force plug after said first-named force plug has reached the end of its pressure stroke.

4. A machine for molding plastics comprising a die, a cylinder containing a chamber communicating with said die for charging said die with plastic, and means for applying pressure to plastic in said cylinder comprising a ram, plunger means comprising a force plug and a second force plug within and movable relative to said first named force plug, means for transmitting pressure from said ram to move said force plugs together in the same direction to apply a certain pressure to said plastic, and means for transmitting pressure from said ram to said inner force plug only, to apply an increased pressure to said plastic.

5. A machine for molding plastics comprising a die, a cylinder containing a chamber communicating with said die for charging said die with plastic, and means for applying pressure to plastic in said cylinder comprising a ram, plunger means comprising a force plug and a second force plug within and movable relative to said first named force plug, means for transmitting pressure from said ram to move said force plugs together in the same direction to apply a certain pressure to said plastic, means for transmitting pressure from said ram to said inner force plug only, to apply an increased pressure to said plastic, and means for holding the first-named force plug and said cylinder in relatively fixed positions during movement of said inner force plug.

6. A machine for molding plastics comprising a die, a cylinder containing a chamber communicating with said die for charging said die with plastic, a ram, and plunger means for applying the force of said ram first to the entire cross-sectional area of said chamber and then to an area in said chamber less than the entire cross-sectional area of said chamber to multiply the pressure of said ram first applied on the plastic in said chamber.

7. A machine for molding plastics comprising a die, a cylinder containing a chamber communicating with said die for charging said die with plastic, and means for applying pressure to plastic in said chamber comprising an outer force plug fitting in said chamber, an inner force plug fitting in and movable relative to said outer force plug, means for applying pressure to said inner force plug, means including a ring for transmitting such pressure to the outer force plug to move said force plugs together in the same direction, and means for locking said ring and said cylinder together to hold said outer force plug in fixed position in said chamber while pressure is applied only to said inner force plug.

8. A machine for molding plastics comprising a die, a cylinder containing a chamber communicating with said die for charging said die with plastic, and means for applying pressure to plastic in said chamber comprising an outer force plug fitting in said chamber, an inner force plug fitting in and movable relative to said outer force plug, means for applying pressure to said inner force plug, means including a ring for transmitting such pressure to the outer force plug to move said force plugs together in the same direction, means for locking said ring and said cylinder together to hold said outer force plug in fixed position in said chamber while pressure is applied to said inner force plug, and means for removing the outer force plug from said chamber.

9. A machine for molding plastics, comprising a die, a cylinder containing a chamber communicating with said die for charging said die with plastic, and means for applying pressure to the plastic in said cylinder comprising a tubular plunger, an inner plunger fitting within and movable relative to said tubular plunger, means for holding said inner plunger retracted within said tubular plunger, and for moving said plungers together as a unit while the inner plunger is so retracted, and for moving said inner plunger relative to said tubular plunger.

FRANK H. SHAW.